United States Patent

[11] 3,589,219

| [72] | Inventor | Hubert J. Parsons |
| | | Horseheads, N.Y. |
| [21] | Appl. No. | 802,464 |
| [22] | Filed | Feb. 26, 1969 |
| [45] | Patented | June 29, 1971 |
| [73] | Assignee | Hardinge Brothers, Inc. |
| | | Elmira, N.Y. |

[54] STOP MEANS FOR CONTROLLING OF AUTOMATIC MECHANISM
5 Claims, 6 Drawing Figs.

[52] U.S. Cl. ................................................. 82/34, 77/34.5
[51] Int. Cl. ............................................... B23b 25/06
[50] Field of Search ........................................... 77/34.5; 82/34.1, 34.2, 34.4; 29/65

[56] References Cited
UNITED STATES PATENTS

| 2,604,000 | 7/1952 | Kjellberg | 82/34 X |
| 2,766,630 | 10/1956 | Ehrler et al. | 82/34 X |

FOREIGN PATENTS

| 854,941 | 1/1940 | France | 82/34 |

*Primary Examiner*—Francis S. Husar
*Attorney*—Shlesinger, Arkwright and Garvey

ABSTRACT: This disclosure is of a stop for an automatic machine tool which is motivated under control of a programming arrangement in which a reduced length of travel of the stop is produced by reversing the direction of movement of the stop with reference to the usual stop screws and in which the usual stop drum is positioned farther forward on the machine for easier setting by the operator and still keep the actual stop at the ideal position with reference to the carriage.

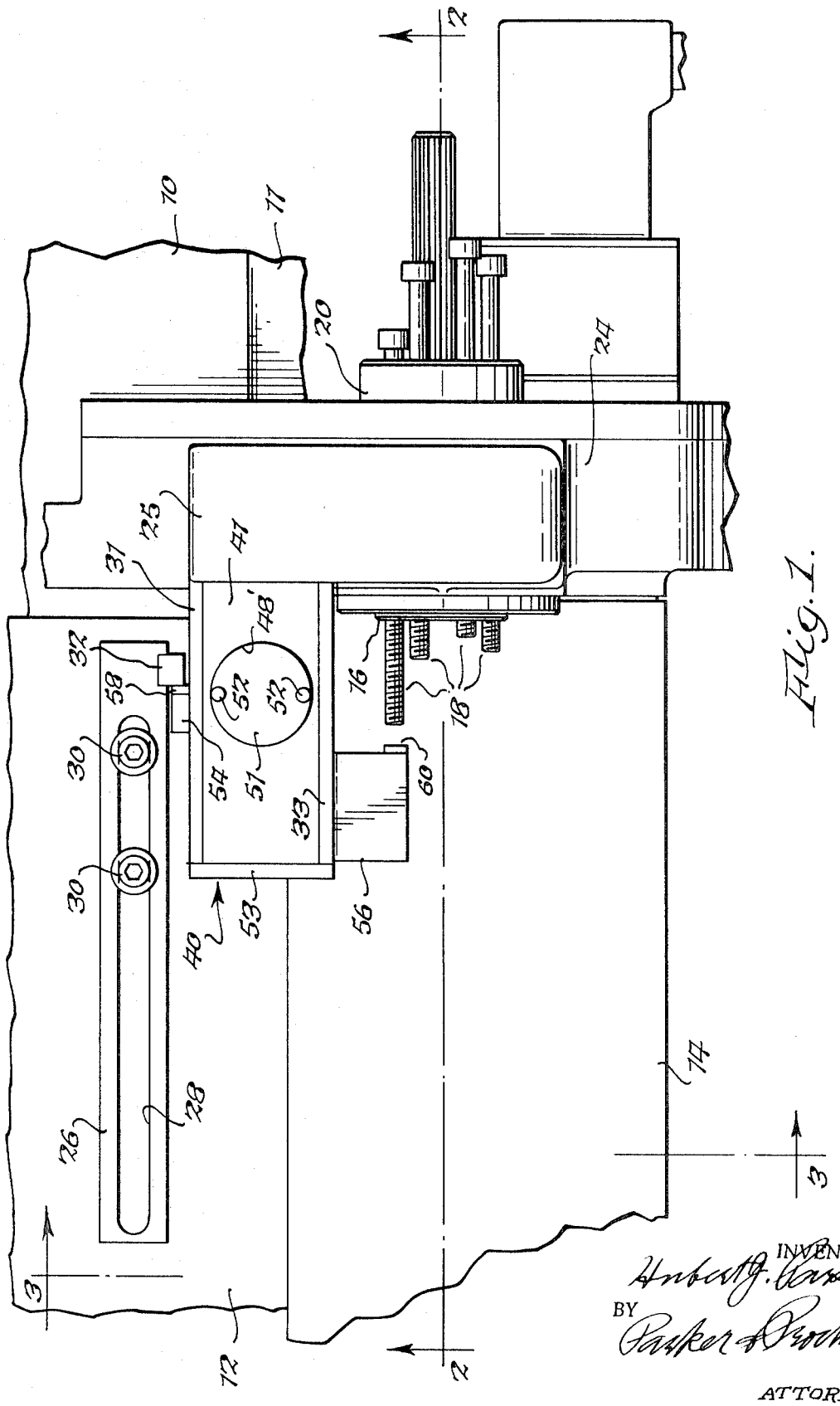

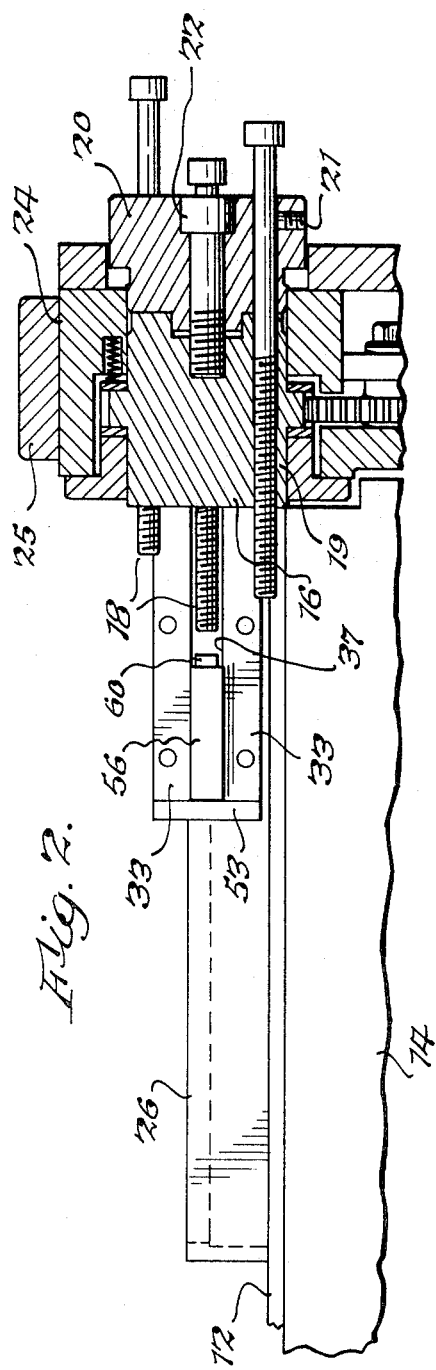
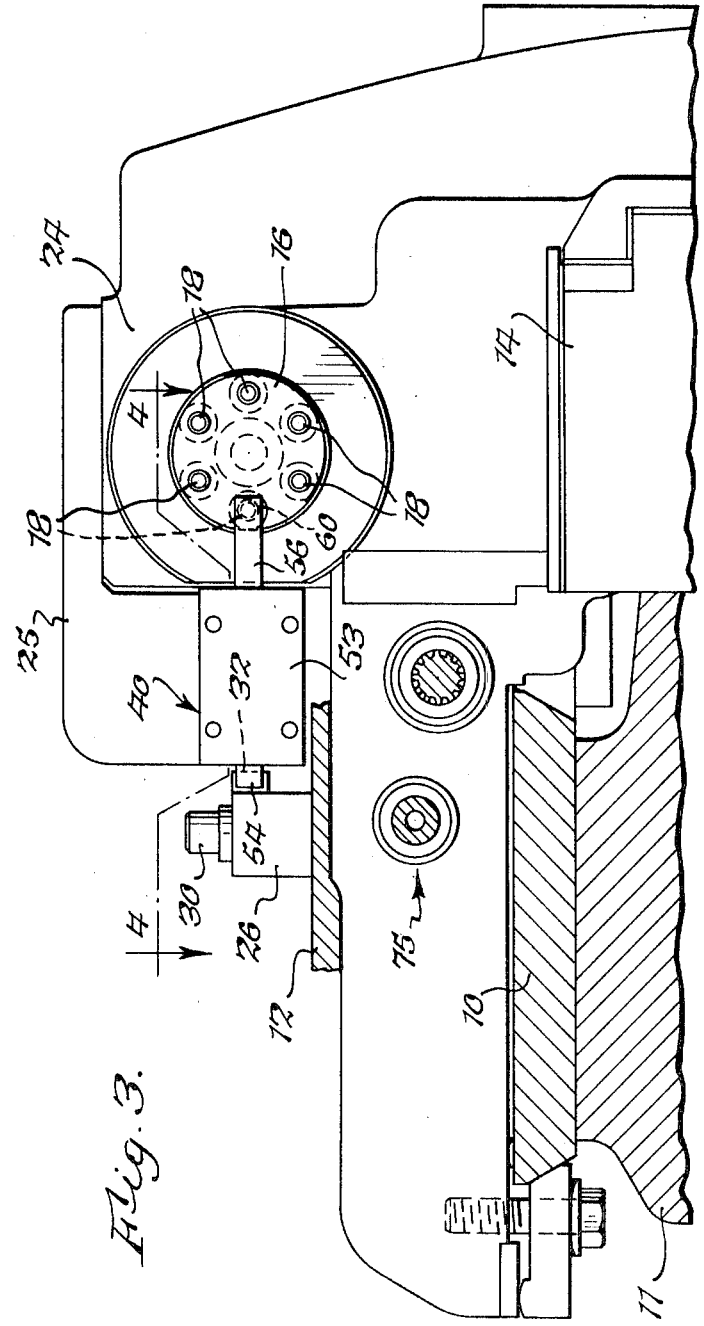

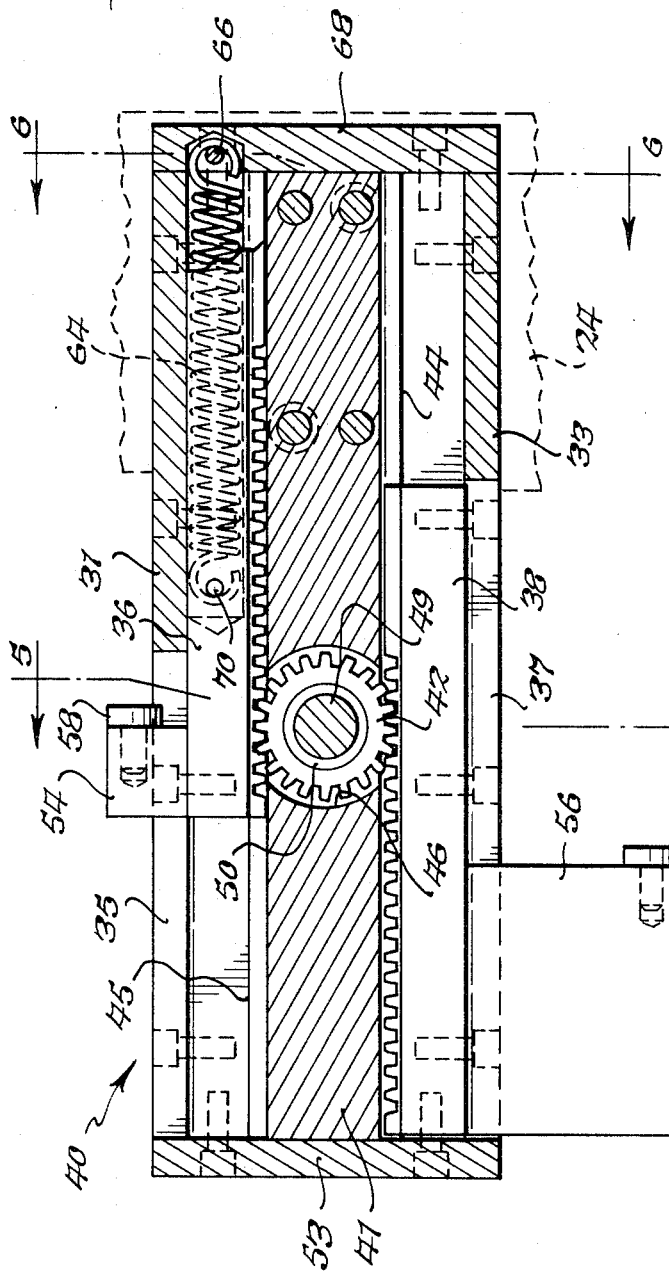
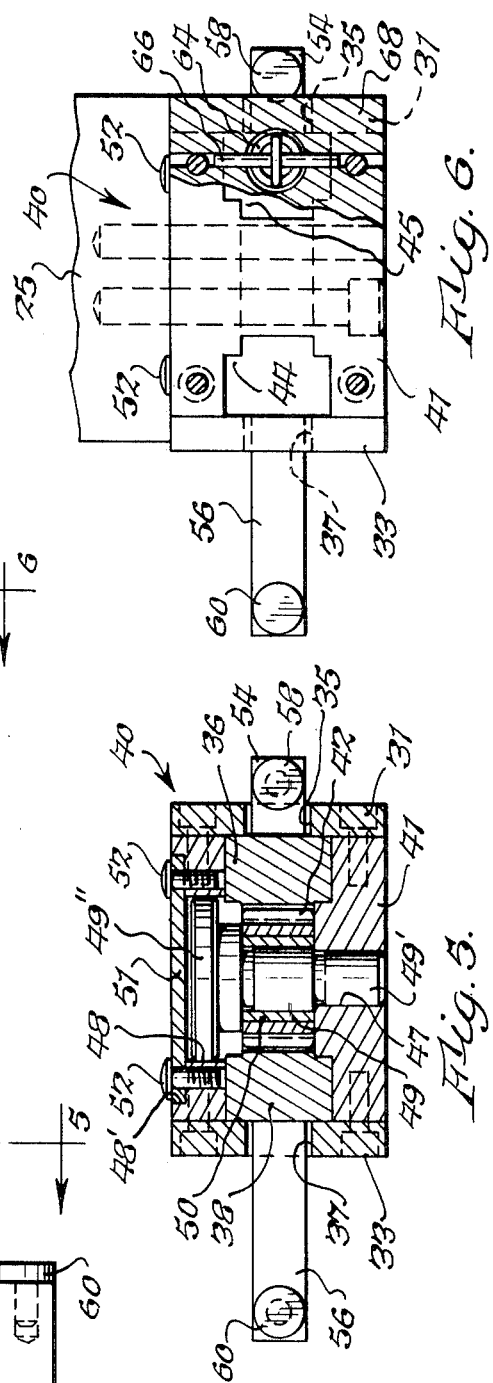

STOP MEANS FOR CONTROLLING OF AUTOMATIC MECHANISM

IN THE ACCOMPANYING DRAWINGS:

FIG. 1 is a fragmentary top plan view of a lathe provided with a stop embodying this invention.

FIG. 2 is a fragmentary vertical sectional view thereof on line 2-2, FIG. 1.

FIG. 3 is a transverse sectional view thereof on line 3-3, FIG. 1.

FIG. 4 is a fragmentary horizontal sectional plan view thereof on an enlarged scale on line 4-4, FIG. 3.

FIGS. 5 and 6 are transverse vertical sectional elevations thereof taken respectively on lines 5-5 and 6-6, FIG. 4.

The herein described improvements are shown as applied to a carriage of a lathe incorporating a programmer, but it will be understood that this stop mechanism may be applied to other automatic machine parts controlled by a programming arrangement including a stop drum with adjustable stop screws.

In the particular construction illustrated by way of example, in which our improvements are applied to a carriage of a lathe, the lathe has a bedway 10 mounted on a supporting bed 11. The bedway may be of any usual construction supporting a carriage 12 which is suitably guided for movement on the bedway. The lathe is operated automatically by means of a programmer which may be of any usual or suitable construction and which is contained in a housing 14 fixed to the bed 11. This programmer controls the movement of the carriage 12 in any suitable or usual manner, and the lathe also has mounted thereon a stop drum 16 having the usual stop screws 18 as commonly employed in connection with automatic machines. The stop drum 16 is of course rotatable by means controlled by the programmer to present different screws into operative positions. These screws are adjustable in threaded apertures in the stop drum for positioning them in different relations in accordance with the work which is to be operated on, and the stop drum may be provided with a stop screw locking device 20 secured by means of a screw 22 to the stop drum.

The stop screws 18 are threaded at only a part of their lengths to engage with threaded parts of the holes 19 in the stop drum 16. The remaining lengths of the screws toward their heads are unthreaded and the holes for the screws in the part 20 and in the parts of the stop drum are not threaded. These stop screws are located in set positions by set screws 21 and the usual brass plugs and shown in FIG. 2 which contact with unthreaded parts of the stop screws. The part 20 is provided for the locking set screws only, thus leaving the stop drum without such locking set screws.

The stop drum 16 is rotatably mounted in a bearing support 24 which in turn is mounted on the bed 11 of the machine. It will be understood of course that the carriage has a part arranged to successively engage the several stop screws at the end of each path of movement of the carriage. These stop screws have heretofore been generally arranged so that they can be engaged directly by a part of the carriage at the end of its path of movement. However in larger machines which operate on longer workpieces this movement of the carriage would be so long that an excessive length of the machine would be necessary before the stop screws are engaged by a part of the carriage. The long movement of the carriage with the addition of the stops and the programmer would make the machine excessively long.

It is therefore an object of this invention to provide a construction whereby such excessive length of the machine is avoided and by means of which the usual stop drum is positioned farther forward on the machine.

For this purpose the carriage has adjustably mounted thereon an arm 26 which extends lengthwise of the direction of travel of the carriage. This arm may be adjustably secured to the carriage in any suitable or desired manner and in the construction shown the arm is provided with a longitudinal slot 28 through which a pair of clamping bolts 30 extend with their threaded ends engaged in threaded holes in the carriage, and the upper ends of these bolts engage the arm 26 at opposite sides of the slot 28. The end of this stop arm has mounted thereon a dog or projection 32 which extends outwardly from the outer end of the stop arm.

A suitable reversing mechanism is mounted on a fixed part of the machine, for example on the bracket 25 fastened to the bearing support 24. This reversing mechanism may be of any usual or suitable construction, that shown including a pair of rack bars 36 and 38 which are slidably mounted on a suitable housing 40, and these rack bars are connected with each other by means of a gear or pinion 42 so that the movement of the rack bar 36 in one direction results in an equal movement of the other rack bar 38 in the opposite direction because of the position of the gear 32 between these two bars. The rack bars are suitably guided for accurate longitudinal movement in the housing 40, which comprises a solid block of metal 41 having guideways 44 and 45 longitudinally milled into the side faces of the block 41. A center bore 46 is drilled into the block having a smaller portion 47 at the bottom and a larger hole 48 at the top with an additional circular recess 48' at the extreme upper portion. The center bore 46 meets with the milled guideways 44 and 45 at either side so that the pinions 42 can mesh with the teeth on the racks 36 and 38.

The guideways 44 and 45 are identical and guide the rack bars 36 and 38 in proper relationship to the pinion 42. The pinion 42 is freely mounted on a pinion shaft 49 by bearing sleeve 50, the shaft having a reduced portion 49' which fits into the lower opening 47 and an enlarged portion 49'' at its upper end fitting into the bore 48. A closure plate or disc 51 closes the center bore 46 to prevent entry of foreign matter and is held in place by screws 52.

An end plate 53 at the left end as seen in FIG. 4 and an end plate 68 at the right close off the ends of the housing 40.

Thus the unit is self-contained, lubrication is held in while foreign matter is kept out of the mechanism.

The rack bar 36 has a projection 54 extending through an opening 35 in the sidewall 31 of the housing containing the reverse mechanism. The other rack bar 38 has a projection 56 extending in the opposite direction from the housing containing the reversing mechanism through an opening 37 in the sidewall 33. Each of these extensions 54 and 56 is provided with hardened wear buttons 58 and 60 which are secured to the extensions so as to be removable when they become damaged due to wear.

The arm or projection 56 of the rack bar 38 is positioned to engage any of the stop screws 18 projecting into the path of movement of the projection 56 and it of course will also be understood that the dog or projection 32 of the stop bar 26 is positioned to engage the projection 54 of the rack bar 36.

The operation of the mechanism thus far described involves in the first place the positioning of the stop arm 26, as may be desired, depending upon the longitudinal dimension of the workpiece being operated upon. The stop arm may be so mounted on the carriage 12 that it may move to a considerable extent without contact of the reversing mechanism for causing contact with any of the stop screws. When the dog or projection 32 finally makes contact with the projection 54 the rack bar 36 is moved to the left in FIG. 4, so that the teeth of the same cooperating with the teeth of the gear or pinion 42 produce movement of the other rack bar 38 in the opposite direction of the movement of the other rack bar 36, but the extent of movement of the rack bar 38 will be exactly the same as that of the rack bar 36. The movement of the rack bar 38 is of course transmitted to the projection 56, which in turn moves into engagement with any one of the stop screws which is positioned in the path of movement of this arm 56. The return of the rack bar 38 and through the gear 42 of the rack bar 36 is effected by means of a spring 64 which is contained in drilled holes in the rack bar 36 and the end wall 68. This spring is secured at one end to a pin 66 mounted on the end wall 68 and the other end is secured at 70 to a pin extending through the rack bar 36. Thus when the carriage is moved in the reverse direction through the medium of the control mechanism, the stop arm is moved back to its starting position so that the dog 32 thereof releases the pressure on the projection 54 of the rack bar 36 of the reversing mechanism. The spring 64 will accordingly move the rack bar 36 of the reversing mechanism back to its starting position, and through the medium of the gear or pinion 42 the other rack bar 38 and its projection 56 will also be moved back to starting position.

The travel of the carriage necessary to actuate the stop screws is consequently greatly reduced by means of the mechanism herein described due to the fact that the stop arm 26 may be adjusted on the carriage or other part to be controlled in such a manner that considerable movement of the carriage may take place before the reversing mechanism is engaged by the stop bar. Thus, for example, the travel of the carriage is 12 inches while the stop screws on the stop drum 16 will only control 2 inches of travel. The adjustment of the stop arm 26 on the carriage 12 allows the use of a 2 inch stop in different places in the carriage travel.

An important advantage of the structure herein disclosed is that the stop drum can be placed forward on the machine, that is towards the operator for easier setting, and still keep the actual stop with reference to the carriage at the ideal position. As is well known, this ideal position is to have the pushing force, stop and tool cutting force all in a line in a horizontal plane and preferably on the centerline of the bedway. As the carriage bearing on the bedway has to have some small clearance if the stop and pushing force are far out of line horizontally, when the stop is hit, a twisting motion will be imparted to the carriage allowed by the clearance and the tool will dig into the work. With very precise bores or turned diameters this cannot be tolerated even though the amount is very small.

On the machine herein described another factor is present which makes some compromise necessary on this ideal situation. This is the presence of a cross slide under the turret carrying the tool and the slots in the turret plate allowing the tool to be mounted at various positions across the centerline of the bedway. This means that the position of the tool pressure will vary considerably on some workpieces from any ideal position that could be found. As the tool settings are usually forward of the centerline of the bedway and spindle, the compromise is made in this direction by placing the usual pushing hydraulic cylinder 75 in this direction relative to the bed. It will be noted that the stop 54 relative to the carriage on this machine has been brought closer to the center of the pushing cylinder 75 than would otherwise be possible, by using this design of stop, and that it is almost on the center of the cylinder. By varying the diameter of the pinion 42 the position of the stop relative to the carriage can be changed without changing the position of the stop drum.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A stop for automatic machines having a part movable thereon under control of a programmer arrangement,
    said movable part having a stop arm adjustably mounted thereon and extending in the direction of the movement of said movable part and having a dog mounted thereon and extending outwardly therefrom,
    a movement reversing mechanism actuated by said dog after initial movement of the same and including a first part positioned to be moved in one direction by said dog and another part moved to the same extent in the opposite direction by said first part,
    a stop drum having stop screws mounted thereon which control the extent of movement of said movable part and which are actuated by said other part of said reversing mechanism,
    and resilient means for returning said reversing mechanism to its original position after said stop screw has been engaged thereby and when said movable part of said machine is moved in the opposite direction.

2. A stop according to claim 1 in which said movement reversing mechanism includes a pair of rack bars connected by a gear which causes one rack bar to move in the opposite direction from the other rack bar,
    one of said rack bars being actuated by said dog and the other rack bar movable into position to contact one of said stop screws.

3. A stop according to claim 1 in which the movement reversing mechanism includes a housing mounted on said machine and having a pair of rack bars guided therein for parallel movement in opposite directions,
    a gear meshing with said rack bars and rotatably mounted in said housing,
    a projection on one of said rack bars extending out of said housing in position to be engaged by said dog,
    and another projection on the other of said rack bars extending in position to engage said stop screws.

4. A stop for an automatic machine having a part movable thereon in opposite directions under a programmer arrangement and including a stop drum having stop screws mounted thereon to control the extent of movement of the movable part,
    a stop arm mounted on said movable part and extending in the direction of movement of said movable part and adjustable on said movable part in the direction of movement of the same,
    a movement reversing mechanism mounted on said machine and including a housing, a pair of rack bars mounted in said housing in position to be moved in opposite directions to each other,
    a gear journaled in said housing and connecting said rack bars for moving the same in opposite directions to the same extent,
    each of said rack bars having a projection,
    said housing having slots therein through which said projections extend,
    means on said stop arm for engaging the projection of one of said rack bars,
    the projection of the other rack bar being positioned to engage said stop screws on said stop drum,
    and resilient means for returning said rack bars to their initial positions after engaging a stop screw and when said movable part of said machine is moved in the reverse direction.

5. A stop for an automatic machine having a part movable thereon under control of a programmer arrangement,
    said programmer arrangement including a stop drum having stop screws extending longitudinally outwardly therefrom,
    said machine having a stop screw actuating part,
    and intermediate gear means positioned to engage said stop screws when actuated by said machine part and spaced from said machine part to require limited movement of said machine part before engaging said intermediate means.